Jan. 4, 1927.
P. J. PETERS
1,613,359
NUT AND BOLT CUTTER
Filed April 23, 1925
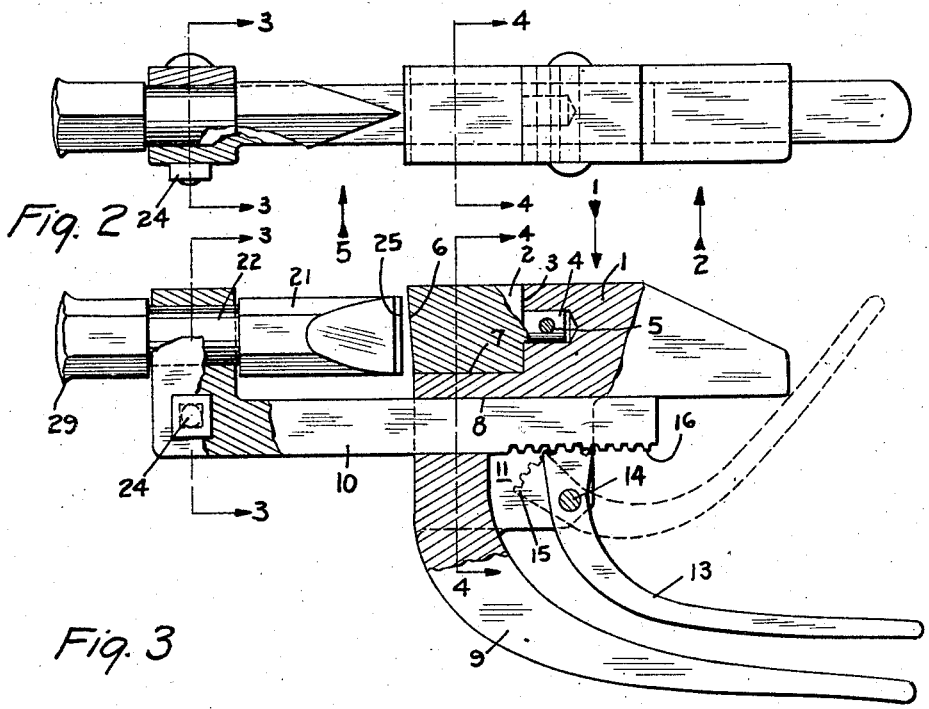
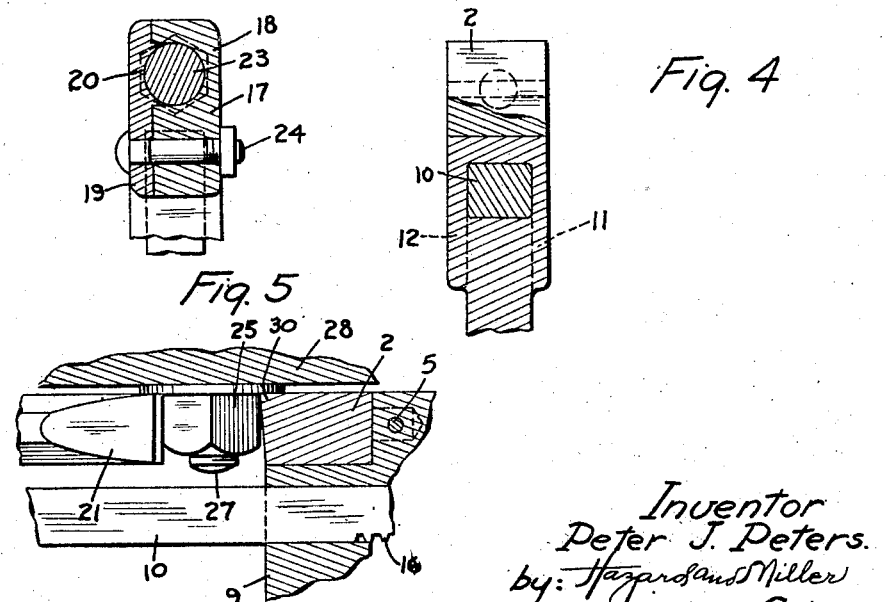
Inventor
Peter J. Peters.
by: Hazard and Miller
Attys.

Patented Jan. 4, 1927.

1,613,359

UNITED STATES PATENT OFFICE.

PETER J. PETERS, OF SHAFTER, CALIFORNIA.

NUT AND BOLT CUTTER.

Application filed April 23, 1925. Serial No. 25,310.

This invention is a nut and bolt cutter and consists of the novel features herein shown, described and claimed.

An object is to make a nut and bolt cutter which is readily portable, capable of doing hard work and adapted for splitting nuts or cutting bolts in wrecking in repair work.

Other objects and advantages will appear from the drawings and specification. The drawings illustrate the invention.

Figure 1 is a top plan view partly in section of a nut and bolt cutter in accordance with the principles of my invention, the view being taken looking in the direction indicated by the arrow 1 in Fig. 2.

Fig. 2 is a side elevation looking in the direction indicated by the arrow 2 in Fig. 1, the parts being shown in section.

Fig. 3 is a cross section on the lines 3—3 of Figs. 1 and 2.

Fig. 4 is a cross section on the lines 4—4 of Figs. 1 and 2.

Fig. 5 is a fragmentary sectional detail illustrating the operation taken in the direction of the arrow 5 of Fig. 1, showing a nut inserted between the cold chisel and the anvil.

The details of construction and operation are as follows:

An anvil supporting head 1 is square or rectangular in cross section. The anvil 2 fits against the end face 3 of the head 1 and has a pintle 4 extending into the head 1 and has a pin 5 inserted through the head 1 and pintle to hold the anvil in place. The anvil is thus rigidly mounted on the head. The anvil 2 is a substantially cubical block of suitable good material, such as hardened cast steel and has a flat slightly inclined working face 6 at the opposite side from the pintle 4 and the anvil rests upon the upper face 7 of a ledge 8 extending from the head 1. A rigid handle 9 extends downwardly from the ledge 8 and then laterally some distance under the head 1.

A rectangular bar 10 is slidingly mounted under the ledge 8 and head 1. Ears 11 and 12 extend downwardly from the head 1 and from the upper end of the handle 9 on each side of the bar 10. A hand lever 13 is mounted between the ears 11 and 12 on a pivot 14 and has a segment of gear teeth 15 to engage a gear rack 16 formed upon the bar 10 so that as the lever 13 is swung up and down on the pivot 14 the rack 10 will move forwardly or backwardly.

A head 17 extends upwardly from the outer end of the bar 10 and carries a half bearing 18, an attaching plate 19 fits against the head 17 and carries the other half bearing 20. The cold chisel 21 has a smooth neck 22 intermediate of its ends and the neck fits in the opening 23 formed by the half bearing 18 and 20 and a bolt 24 connects the two half bearings together to hold the chisel. As the hand lever 13 is operated the cutting edge 25 of the chisel will move to or from the working face 6 of the anvil 2. The lever 13 may be raised as shown in dotted lines in Fig. 2, thus bringing the segment 15 out of mesh with the rack 16 so that the chisel may be adjusted to work of different sizes.

In Fig. 5 it is desired to remove the old nut 26 from the old bolt 27 so as to remove the bolt from the work 28 and in order to do this I raised the handle 13, placed the anvil 2 against one side of the nut 26, and the chisel cutting edge 25 against the opposite side of the nut, then strike the head 29 of the chisel with a hammer heavy enough to cause the chisel to split the nut, then the nut will fall off of the bolt and the bolt may be readily driven out of the work.

Other operations may be performed in a similar manner.

The face 6 of the anvil 2 is slightly inclined so as to make a projecting corner 30 to engage the base of the nut 26 and crowd under the nut and hold the nut while the chisel is operating and to create a tendency to press the nut outwardly from the work. In other words, to make the device grip the nut while the operation is being performed.

The chisel 21 rotates freely in the bearing so that the cutting edge 25 may be used at any desired angle upon the face 6. The handle 13 is in opposition to the rigid handle 9 and may be grasped by one hand of the operator and pressing the handle 13 towards the handle 9 presses the chisel towards the work and as the striking process proceeds to cut the work, the handle 13 will move towards the handle 9, thereby holding the chisel against the work.

If desired the anvil working face 6 may be formed upon the head 1, but I prefer to make the anvil a separate piece so that when it became worn it may be removed and a new piece substituted.

Thus I have produced a nut and bolt cutter comprising an anvil, a rigid handle extending from the anvil, a chisel carrier slidingly mounted in opposition to the anvil, a chisel in the chisel carrier and a hand lever construction for pressing the chisel towards the anvil.

Various changes may be made without departing from the spirit of my invention as claimed.

I claim:

1. A nut and bolt cutter, comprising in combination an anvil supporting head, an anvil secured therein, a handle attached to the head and having an opening therethrough adjacent the head, whereby the head forms a straight ledge, a cold chisel holder having a rectangular bar slidably mounted through the opening in the handle and against the ledge, means to support the cold chisel in the cold chisel holder and a second handle having a pivotal connection to the anvil holder and operatively connected to the rectangular bar to slide same to thereby press the chisel against a nut or bolt gripped between the chisel and the anvil while said chisel may be struck by a hammer.

2. An nut and bolt cutter comprising in combination an anvil supporting head of substantially rectangular cross section, an anvil secured in said head at one end, a handle and a pair of ears connected to the anvil head, the handle having an opening therethrough forming a ledge along the side of the head, a cold chisel holder having a rectangular bar slidable through the opening in the handle and bearing on one edge against the ledge, rack teeth on the opposite edge of the bar, a hand lever pivotally supported by the said ears and having teeth to engage the rack and a pair of clamping jaws attached to said bar adapted to loosely engage a chisel whereby on pressing together the handle and the handle lever, the cold chisel may rest upon a nut or bolt between same and the anvil while being struck by a hammer.

3. A nut and bolt cutter comprising in combination an anvil supporting head, an anvil secured therein, a fixed handle attached to the head, the handle having an opening adjacent the head, a cold chisel holder having a bar with teeth thereon slidably mounted through the opening in the handle, means to support a cold chisel in the cold chisel holder to allow rotation and longitudinal movement thereof, a moving handle having a pivotal connection to the anvil holder, segmental teeth on the moving handle engaging the teeth on the bar, whereby the actuation of the moving handle towards the fixed handle presses the chisel against a nut or bolt between the chisel and the anvil while said chisel may be struck by a hammer.

In testimony whereof I have signed my name to this specification.

PETER J. PETERS.